US009237068B2

(12) United States Patent
Porter et al.

(10) Patent No.: US 9,237,068 B2
(45) Date of Patent: *Jan. 12, 2016

(54) SYSTEM AND METHOD FOR DISTRIBUTING HEURISTICS TO NETWORK INTERMEDIARY DEVICES

(75) Inventors: Kevin Porter, Guelph (CA); Thomas J. Kelly, Fergus (CA); Marcin Lukasz Lizon, Waterloo (CA); Darrell Long, Austin, TX (US); Eric Maki, Kitchener (CA); Kim Tremblay, Kitchener (CA); Jennifer Vance, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/017,027

(22) Filed: Jan. 30, 2011

(65) Prior Publication Data

US 2012/0198038 A1    Aug. 2, 2012

(51) Int. Cl.
*H04L 12/24*    (2006.01)

(52) U.S. Cl.
CPC .......... *H04L 41/082* (2013.01); *H04L 41/0893* (2013.01); *H04L 41/5054* (2013.01)

(58) Field of Classification Search
CPC ............... H04L 41/0213; H04L 29/06; H04L 29/08072; H05K 999/99; G11C 29/88; G06F 12/0804; G06F 12/0831; G06F 12/0833; G06F 12/0888; G06F 12/126; G06F 9/30047; G06F 11/10; G06F 11/1064; G06F 11/2205; G06F 13/362; G06F 13/374; G06F 11/22
USPC ......................................................... 709/223
See application file for complete search history.

(56) References Cited

U.S. PATENT DOCUMENTS

| 6,577,597 | B1 * | 6/2003 | Natarajan | H04L 12/2854 370/232 |
| 7,047,287 | B2 * | 5/2006 | Sim | G06F 17/30194 707/E17.01 |
| 7,302,455 | B1 | 11/2007 | Cordsmeyer et al. | |
| 7,433,944 | B2 * | 10/2008 | Kanada | H04L 41/0213 709/217 |
| 7,447,755 | B1 * | 11/2008 | Maxted | H04L 63/0227 709/223 |
| 7,555,552 | B2 * | 6/2009 | Maxted | H04L 63/0227 709/225 |
| 7,970,923 | B2 * | 6/2011 | Pedersen | H04L 63/0272 709/219 |
| 7,983,272 | B2 * | 7/2011 | Carlson | H04L 12/2602 370/395.4 |
| 8,156,566 | B2 * | 4/2012 | Lim | G06F 21/6218 713/167 |
| 8,370,474 | B1 * | 2/2013 | Reeves | H04L 29/00 707/691 |
| 2001/0039576 | A1 | 11/2001 | Kanada | |
| 2002/0156879 | A1 * | 10/2002 | Delany | H04L 63/102 709/223 |
| 2003/0065762 | A1 * | 4/2003 | Stolorz | H04L 12/2602 709/223 |
| 2003/0149581 | A1 * | 8/2003 | Chaudhri | G06Q 30/0601 709/203 |

(Continued)

OTHER PUBLICATIONS

Office Action dated Feb. 4, 2013, from U.S. Appl. No. 13/017,028, filed Jan. 30, 2011, 15 pages.

(Continued)

*Primary Examiner* — Eleni Shiferaw
*Assistant Examiner* — Nelson Giddins
(74) *Attorney, Agent, or Firm* — Ascenda Law Group, PC

(57) ABSTRACT

A policy distribution server provides, on a subscription basis, policy updates to effect desired behaviors of network intermediary devices. The policy updates may specify caching policies, and may in some instances, include instructions for data collection by the network intermediary devices. Data collected in accordance with such instructions may be used to inform future policy updates distributed to the network intermediary devices.

17 Claims, 2 Drawing Sheets

(56) References Cited

U.S. PATENT DOCUMENTS

| | | | | |
|---|---|---|---|---|
| 2004/0230747 A1* | 11/2004 | Ims | G06F 17/30902 | 711/133 |
| 2007/0150441 A1* | 6/2007 | Morris | H04L 67/24 | 1/1 |
| 2007/0156694 A1* | 7/2007 | Lim | G06F 21/6218 | 1/1 |
| 2007/0156727 A1* | 7/2007 | Lim | G06F 21/6218 | 1/1 |
| 2007/0192827 A1* | 8/2007 | Maxted | H04L 63/0281 | 726/1 |
| 2007/0244987 A1* | 10/2007 | Pedersen | H04L 63/0272 | 709/217 |
| 2007/0294373 A1* | 12/2007 | Harrison | H04L 29/06 | 709/219 |
| 2008/0147866 A1* | 6/2008 | Stolorz | H04L 12/2602 | 709/226 |
| 2008/0215718 A1* | 9/2008 | Stolorz | H04L 61/1511 | 709/223 |
| 2008/0244696 A1* | 10/2008 | Bhola | G06F 21/6218 | 726/1 |
| 2008/0313207 A1* | 12/2008 | Modad | G06F 17/30525 | 1/1 |
| 2009/0210502 A1* | 8/2009 | Ocampo | H04L 51/38 | 709/206 |
| 2009/0210912 A1* | 8/2009 | Cholas | H04N 5/4401 | 725/82 |
| 2010/0131650 A1* | 5/2010 | Pok | H04L 41/0896 | 709/226 |
| 2010/0169970 A1 | 7/2010 | Stolfo et al. | | |
| 2010/0174939 A1* | 7/2010 | Vexler | G06F 17/3048 | 714/5.1 |
| 2010/0235329 A1* | 9/2010 | Koren | G06F 17/30902 | 707/687 |
| 2010/0235514 A1* | 9/2010 | Beachem | G06F 21/57 | 709/227 |
| 2010/0268772 A1* | 10/2010 | Romanek | H04L 67/306 | 709/203 |
| 2010/0303240 A1* | 12/2010 | Beachem | G06F 21/57 | 380/277 |
| 2011/0145386 A1* | 6/2011 | Stolorz | H04L 61/1511 | 709/223 |
| 2011/0219134 A1* | 9/2011 | Lidstrom | H04L 65/80 | 709/229 |
| 2011/0320592 A1* | 12/2011 | Kemmerer, Jr. | H04L 41/0896 | 709/224 |
| 2012/0078994 A1* | 3/2012 | Jackowski | H04L 47/19 | 709/219 |
| 2012/0110128 A1* | 5/2012 | Aaron | H04L 67/1008 | 709/219 |
| 2012/0136980 A1* | 5/2012 | Godfrey | H04L 29/06 | 709/223 |
| 2012/0197965 A1* | 8/2012 | McCanne | H03M 7/30 | 709/202 |
| 2012/0198038 A1* | 8/2012 | Porter | H04L 41/082 | 709/223 |
| 2012/0198050 A1* | 8/2012 | Maki | H04L 43/04 | 709/224 |

OTHER PUBLICATIONS

Response to Office Action filed May 6, 2013, from U.S. Appl. No. 13/017,028, filed Jan. 30, 2011, 14 pages.

Office Action dated Aug. 28, 2013, from U.S. Appl. No. 13/017,028, filed Jan. 30, 2011, 15 pages.

Response to Office Action filed Nov. 27, 2013, from U.S. Appl. No. 13/017,02, filed Jan. 30, 2011, 12 pages.

Final Office Action dated Mar. 24, 2014, from U.S. Appl. No. 13/017,028, filed Jan. 30, 2011, 16 pages.

Response to Final Office Action filed Jun. 23, 2014, from U.S. Appl. No. 13/017,028, filed Jan. 30, 2011, 10 pages.

Office Action dated Aug. 13, 2014, from U.S. Appl. No. 13/017,028, filed Jan. 30, 2011, 19 pages.

Response to Office Action filed Nov. 13, 2014, from U.S. Appl. No. 13/017,028, filed Jan. 30, 2011, 4 pages.

Office Action dated Feb. 10, 2015, from U.S. Appl. No. 13/017,028, filed Jan. 30, 2011, 16 pgs.

Amendment filed May 8, 2015, from U.S. Appl. No. 13/017,028, filed Jan. 30, 2011, 8 pages.

Notice of Allowance dated Jun. 1, 2015, from U.S. Appl. No. 13/017,028, filed Jan. 30, 2011, 5 pages.

* cited by examiner

SYSTEM AND METHOD FOR DISTRIBUTING HEURISTICS TO NETWORK INTERMEDIARY DEVICES

FIELD OF THE INVENTION

The present invention relates generally to systems and methods for distributing heuristics to network intermediary devices (e.g., network caching appliances), said heuristics representing, for example, caching policy updates to accommodate changes in the behavior of content servers and to effect other desired behaviors of the network intermediary devices without the need for operating system updates and the like.

BACKGROUND OF THE INVENTION

Typically, when a client computer system requests content from a server, whether over the Internet or, in some instances, over a local and/or wide area network, the request is intercepted at one or more intermediary devices, each of which may alter the request in some way, according to rules installed on the intermediary device. The intent of these rules, and their embodiment, are commonly known as policies. Policies thus define behaviors of the intermediary devices in connection with the requests.

One common form of intermediary device is a cache: a device that maintains copies of requested information (e.g., web pages and the like) so that multiple requests for the same information can be satisfied at the cache. When requests for information are satisfied at a cache, server devices need not receive the requests, process them, and retransmit the same information over a communication channel that links the client devices and the server devices. In the context of typical web browsing, for example, the server devices can be web servers, the client devices can be web clients (e.g. browsers running on personal computers and the like), the communication channel can be an Internet Protocol (IP) network such as the Internet, and the requested information can be web pages and or objects (e.g. images, videos, etc.).

Not surprisingly, in light of the above, caches are often instantiated with or operated according to policies that affect their behaviors in the context of the requests received at the caches and the sites for which the requests are destined. In particular, caches generally are provided with caching polices. These caching polices are sometimes written according to well-established and published guidelines for how certain content is to be cached (e.g., RFC 2616 promulgated by the Internet Engineering Task Force), but such policies do not always work well in the context of certain web sites. For example, with some web sites, specially defined policies may be required in order to dictate caching behavior that optimizes bandwidth savings. Often this may be due to the web site designers not considering good cache efficiencies when designing their sites, but in other cases it may be due to the peculiarities of the content hosted at the site, the manner in which the content is stored at the servers, the physical or logical arrangements of the servers hosting the content of interest, or other factors.

In the past, in order to deal with these problematic (from a cache efficiency point of vim) web sites, cache providers would have to develop custom solutions or "fixes" as individual customers (e.g., Internet service providers, enterprise network managers, and the like) reported problems. These custom solutions were often only developed after tedious review of voluminous log files obtained from the cache devices and were then distributed somewhat haphazardly as custom configuration files and the like to the cache providers' individual customers. Such distribution occurred through technical briefs, e-mail transmissions or postings on forums, and it was up to the customers to use and install them or not. This of course required knowledgeable customers and there was no guarantee that installing such a custom configuration file would even cure the problem that was initially observed. Thus, each caching problem was treated as a separate instance, with separate and disparate solutions being developed by researchers and others working in isolation from one another.

SUMMARY OF THE INVENTION

In various implementations the present invention provides systems and methods for distributing, from a policy distribution server to one or more network intermediary devices communicatively coupled to the policy distribution server, on a subscription basis, policy updates to effect desired behaviors of the network intermediary devices. The policy updates may specify caching policies, and may in some instances, include instructions for data collection by the network intermediary devices. Data collected in accordance with such instructions may be used to inform future policy updates distributed to the network intermediary devices.

In some instances, the caching policy updates may be caching policy language files and/or may include directives for data collection by the network intermediary devices, directives for the network intermediary devices to cache or not cache one or more specified web sites or specified objects, directives for the network intermediary devices to employ specific caching methodologies for specified web sites or specified objects, and directives for the network intermediary devices to cache specified web sites or objects beyond their respective, specified time to live. Prior to distributing the policy updates the network intermediary devices may be authenticated. Distributions to the network intermediary devices may occur periodically and randomly from one another, and may be made responsive to requests for same by the network intermediary devices. In some cases, these requests are made according to schedules directed by previously distributed policy updates.

These and other features and advantages of the present invention are described in greater detail below.

BRIEF DESCRIPTION OF THE DRAWINGS

The present invention is illustrated by way of example, and not limitation in the figures of the accompanying drawings, which illustrate various embodiments of the present invention.

DETAILED DESCRIPTION

Figure 1:
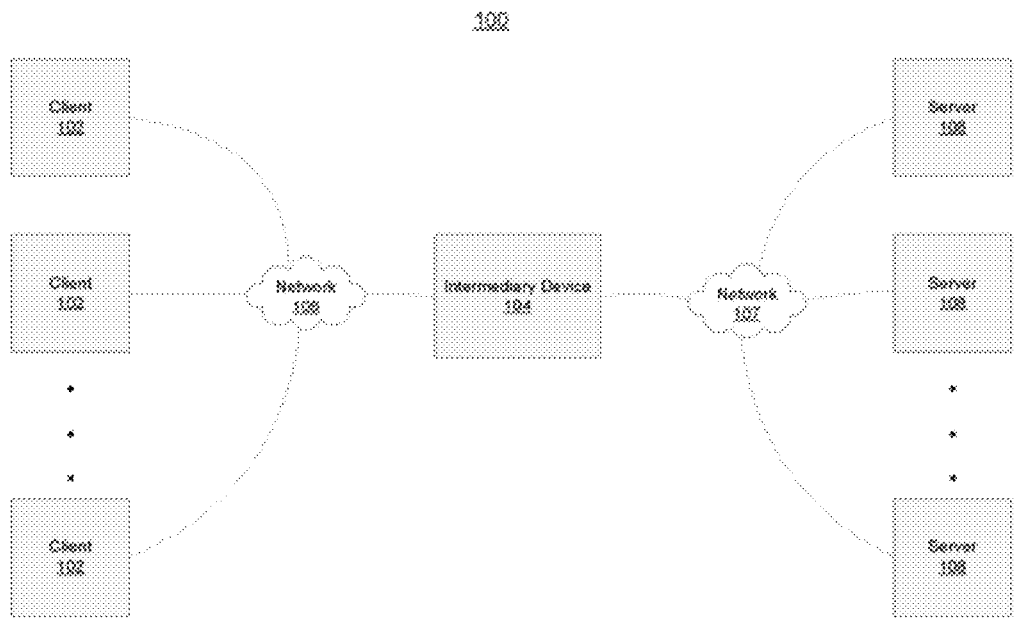
FIG. 1 illustrates a network having an intermediary device configured according to one embodiment of the present invention.

The present invention provides systems and methods for distributing heuristics to network intermediary devices (such as network caches and the like). These heuristics may represent policy updates (e.g., caching policy updates) to accommodate changes in the behavior of content servers and to effect other desired behaviors of the network intermediary devices, without the need for operating system updates and the like. In some embodiments of the invention the heuristics are delivered in a subscription fashion.

One example of a network intermediary device, which is discussed in connection with examples provided below, is a network caching appliance. The term "appliance" is sometimes used to describe a special-purpose computer system that requires minimal customer/operator intervention. The analogy is to a home appliance, which is expected by a home owner to function as intended when supplied with power and operated in accordance with its user instructions. Special-purpose computer systems may be implemented as network-attached appliances and may run system software, such as embedded operating systems, device drivers, or various utilities. While an appliance may be sold with a particular version of system software loaded on it, updates to such software, e.g., an upgrade to the embedded operating system or in the case of the present invention, a policy or a software patch addressing a defect, may become available after the appliance has been placed in service. Controlling access to policy upgrades is important from the appliance vendor's point of view (inasmuch as the vendor seeks to ensure that only authorized customers receive the benefit of the new software) and the appliance owner/user's point of view (inasmuch as the owner/user wishes to maintain configuration control over his/her equipment). Of course, in some instances the "appliance" nature of the network intermediary device will be realized through software or firmware control of general purpose hardware, and such devices are intended to be within the scope of the present invention. It should be understood that although examples of heuristic updates for caching appliances and the like are provided herein in order to aid in the discussion of the present invention, the invention is not limited to use in connection with caching appliances nor to caching policy updates and may apply to the delivery of heuristics to network intermediary devices other than just caching appliances.

Some portions of the detailed descriptions that follow are presented in terms of algorithms and symbolic representations of operations on data within a computer memory or other storage device. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium such as, but is not limited to, any type of disk including hard disks, optical disks, CD-ROMs, and magnetic-optical disks, read-only memories (ROMs), random access memories (RAMs), electrically programmable ROMs (EPROMs), electrically erasable and programmable ROMs (EEPROMs), flash memories, or other types of storage media suitable for storing electronic instructions.

Moreover, terms such as "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), objects) and/or information returned from the network device. Furthermore, the terms "communication" and "client communication" may be used interchangeably to mean the overall process of a client making a request and the network device responding to the request.

FIG. 1 is a block diagram of one embodiment of a network system 100 utilizing a network device, such as an intermediary device. It comprises any number of client devices 102 connected to an intermediary device 104 via a network 106. A client device 102 ("client") is a computing device capable of making a request (e.g., for an object, service, etc.) over the network 106 and receiving a response for the request. For instance, the client 102 may be a personal computer (PC), a hand-held device or personal digital assistant (PDA) type device, a mobile phone, a tablet computer, etc. In one embodiment, the client is a PC running a web browser application and may make requests for objects over the network 106 by utilizing the web browser. Each client device is coupled to the intermediary device using a client communication path that can include a dial-up connection, a LAN, a WAN, an IP network (such as an internet, intranet, or extranet), or some combination thereof. As used herein, the terms "client" and "server" refer to relationships between the client or server and the intermediary device, not necessarily to particular physical devices. As used herein, the term "client device" includes any device taking on the role of a client in a client-server environment. There is no particular requirement that the client devices 102 must be individual devices; they can each be a single device, a set of cooperating devices, a portion of a device, or some combination thereof.

The intermediary device 104 is a computing device capable of receiving and responding to the request made by the client 102. In one embodiment, the intermediary device 104 is a cache appliance with an internal object store housing objects that may be requested by the client 102. The intermediary device is communicatively coupled to any of a number of content servers 108 via a network 107.

Networks 106 and 107 may be distinctly separate networks or the same (or portions of the same) network and may be any kind of networks known in the art. For instance, networks 106 and 107 may be private networks, such as intranets, extranets, local area networks (LANs), or wide area networks (WANs). Networks 106 and 107 may also be (in whole or in part) public networks, such as the Internet. Furthermore, many computer devices have multiple network interfaces and, thus, networks 106 and 107 may contain multiple upstream or downstream networks of wired and/or wireless segments. Nevertheless, in the interest of brevity, networks 106 and 107 will hereafter be referred to by the general term "network" to mean any kind of medium over which the client 102 and the intermediary device 104 communicate.

Servers 108 provide content to the intermediary device 104. The purpose of the plurality of servers 108 is to provide a requested object to the intermediary device 104 when the intermediary device 104 does not have the object in its object store. The intermediary device 104 has the ability to query any one of the plurality of servers 108 for the object. Servers 108 are computer devices that can receive the query and respond in kind with the requested object. Each server device is coupled to the intermediary device using a server communication path that can include a dial-up connection, a LAN, a WAN, an IP network or some combination thereof. In one embodiment, the server communication path includes an internet backbone and an internet connection between the intermediary device and the internet backbone. As used herein, the term "server device" includes any device taking on the role of a server in a client-server environment. There is no particular requirement that the server devices 108 must be individual devices; they can each be a single device, a set of cooperating devices, a portion of a device, or some combination thereof. Generally, a server device will include memory or storage for recording one or more web objects, which can be any type of data suitable for transmitting to the client device 102 (e.g., text, color, formatting and directions for display; pictures, data in graphical formats (such as GIF or JPEG), other multimedia data; animation, audio (such as streaming audio), movies, and video (such as streaming video), and other data in audio or visual formats (such as MPEG); program fragments, including applets, Java, JavaScript, and ActiveX; and other web documents and data types).

Figure 2:
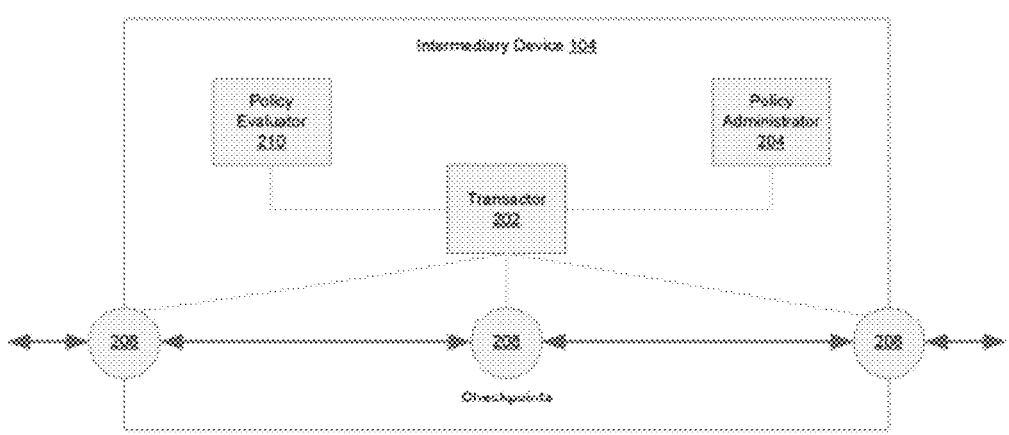
FIG. 2 illustrates further details of the intermediary device configured according to one embodiment of the invention.

FIG. 2 is a block diagram of one embodiment of an intermediary device 104, according to the present invention. Intermediary device 104 includes a transactor 202, a policy administrator 204, a plurality of checkpoints 208, and a policy evaluator 210. The transactor 202 is configured to establish a connection at the beginning of a client/intermediary device communication ("client communication"), facilitate the progress of a request and response throughout the client communication, and close the connection at the end of the client communication. Transactor 202 may be protocol specific, to facilitate requests made according to distinct communication protocols, or may be protocol agnostic in order to accommodate multiple different protocols.

The policy administrator 204 is configured to maintain a current version of policies and assign to the transactor 202 the most current version of a policy available at the time the client communication begins. The transactor thus handles the client communication in accordance with the assigned policy specified by the policy administrator. In some instances, the client communication may be defined by various checkpoints 208 and the transactor may perform designated activities (in accordance with the policy) when the client communication reaches those checkpoints. In various instances there may be more or fewer checkpoints that are illustrated in the diagram. Policy evaluator 210 collects statistics regarding the operation of transactor 202 for various communications and policies, for use in accordance with the present invention.

Figure 3:
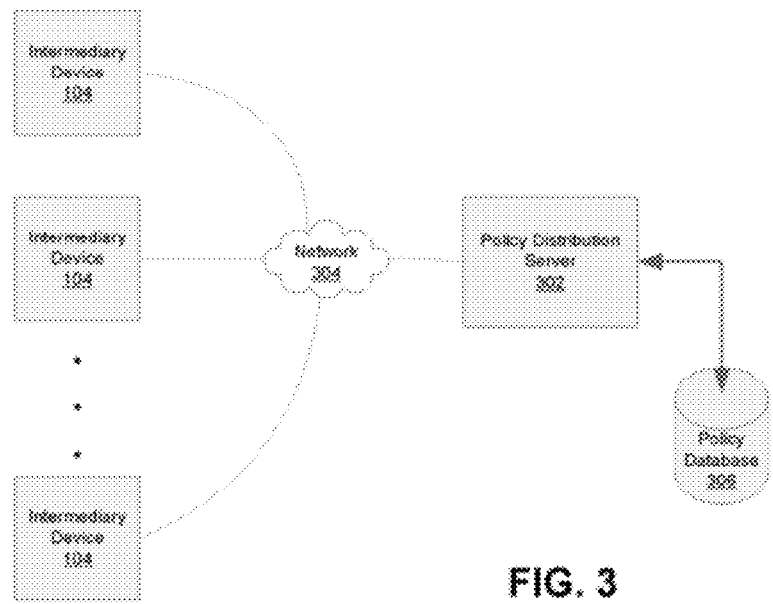
FIG. 3 illustrates the deployment of a policy distribution server within a network in accordance with an embodiment of the present invention.

FIG. 3 shows a block diagram of a system having multiple intermediary devices 104 (e.g., caches) communicatively coupled to a policy distribution server 302 via a network 304. Although not shown in this view, it should be recognized that each of the intermediary devices 104 may service multiple clients and thus be communicatively coupled to multiple servers across one or more networks. Like networks 106 and 107, network 304 may be any public and/or private network and the policy data server-to-intermediary device communication path may include direct connections, or connections over a LAN, a WAN, an IP network, etc.

As indicated above, some intermediary devices, such as cache appliances, are intended to save transit bandwidth costs by caching user-requested web content. However, many web destinations do not cache well with simple or generic rules and require tuned, site-specific polices. Other intermediary devices may be deployed with other or additional goals in mind. For example some intermediary devices may seek to improve request response times, and/or provide transcoding or translations of requests (in addition to bandwidth savings, for example). In general, such devices are often aimed at reducing costs and/or improving client "experiences", and such improvements may be measured by a variety of different metrics. Achieving these goals requires a set of policies that is both flexible and broad in coverage.

The policy distribution server 302—a centralized, subscription-based distribution node for network intermediary device vendor-approved solutions—provides an effective means for distributing these policies (e.g., site-specific caching policies) to network intermediary devices (e.g., caching appliances and other devices/systems). The policy distribution server maintains a policy database 306 where policy updates may be stored for distribution to the various intermediary devices. In one example, the updates may be caching policy updates, but other updates regarding other kinds of policies may also be distributed in this fashion.

As used herein, the term policy refers to configuration values and rules applied to render decisions on client connections and the like. Often, the policy references system configuration for the default values for some settings and then evaluates rules to see if those settings should be overridden. The policies may be expressed as caching policy language files, databases, signature-oriented rules, or other forms and formats. However expressed, the policies are installed on an intermediary device (e.g., after being downloaded from the policy distribution server), and are evaluated during request processing (e.g., in some instances to override any default decisions taken from configuration files at the intermediary device).

Unlike software updates, which may comprise entire operating system or application programs in and of themselves, or at a minimum are generally large pieces of software, the subject policy updates are lightweight files. The policies expressed by these updates dictate how the intermediary devices should handle various situations, for example the caching of identified web sites (or other content sites), which require particularized solutions, in some embodiments, the polices distributed in the context of updates control operations of the intermediary devices which are not exposed to users thereof. Among the examples of policies that may be distributed in this fashion are directives to cache or not to cache specified web sites or objects, to employ specific caching methodologies for specified web sites or objects, and/or to cache specified web sites or objects beyond their respective, specified time to live, etc.

The distribution of the policy updates may be handled on a subscription basis. That is, only intermediary devices that are associated with subscription accounts may be eligible to receive the updates. This subscription-based distribution may be managed by having the policy administrators of the intermediary devices periodically contact the policy distribution server in order to check for updates. An intermediary device's entitlement to an update may be determined by the policy distribution server issuing a challenge for authorization credentials, such as a unique user name/password combination, a device serial number or other identifying information. When an intermediary device's authentication credentials are presented to the policy distribution server, the device's entitlement to the update(s) is checked, and, if it is determined that the intermediary device is indeed entitled to the update(s), the appropriate update(s) is(are) supplied. So that the policy distribution server is not overwhelmed, the various intermediary, devices may be configured to contact the policy distribution server at different times than one another and/or at random or pseudo-random times.

In some cases, one policy update may be provided to all authorized intermediary devices, with different policies coded for use by specific intermediary devices. For example, certain policies may be coded for use only by intermediary devices of a particular customer, by intermediary devices deployed in particular countries or regions, by devices deployed on certain kinds of network connections, by devices having certain versions of operating systems, etc. Alternatively, the policy distribution server may provide unique policy updates to different intermediary devices on the basis of the identity of the device. That is, the intelligence for determining which updates to apply or instantiate at which intermediary device may reside on the intermediary device, on the policy distribution server, or on both.

Of course, delivering policy updates is only effective if means exist for determining what kind of updates are needed and when. Content servers may, alter their behaviors at any time, thus rendering any previously deployed caching policies obsolete or at least ineffective. Accordingly, comprehensive identification of caching problems is a prerequisite for delivering effective solutions, but outside of anecdotal reports from users running pre-planned tests, such identification is a task that hitherto entailed analysis of vast quantities of often inaccessible or difficult to comprehend data.

To address the need for knowledge concerning the effectiveness of the installed base of policies in intermediary devices, the present invention provides a feedback mechanism incorporated into and controlled by the policy distribution framework. This feedback means can extract and deliver quantitative data about traffic, usage and policy-decision results to the policy distribution server (or other server receiving the feedback information) via communications from the intermediary devices. The communications may include a variety of equipment information, attributes of user requests, the results of processing by the intermediary devices, and many other possibilities and, in accordance with the present invention, may also include information relevant to the monitoring of cache policy effectiveness. This obviates the need for customers to provide logs or other data and the information so collected can be used to develop future policy updates for the same intermediary devices that supplied the feedback. Because the nature and frequency of the information provided via this feedback process is itself subject to control by subscription-delivered policies, it can be easily changed without requiring a complete software release or upgrade.

The gathered information can be provided in individual fashion, or it can be aggregated in a number of possible forms, for example, counts or accumulated value for some single quantity (e.g., numbers of requests adhering to some expressed criterion), counts or accumulated values broken down by a key generated from some aspect of the traffic (e.g., numbers of requests by domain for some criterion), histograms of accumulated values which break down a single quantity by distribution, and/or keyed value tables which quantify the consistency or discrete behaviors, indicate whether a behavior exhibits consistently or not, or if a behavior is non-uniform, etc. Aggregated information is then potentially filtered according to a set of dynamic rules, and transported back to the policy distribution server (or other server receiving the feedback information) for analysis.

The information reporting schedule may be periodic per intermediary device, but is preferably randomized across devices to avoid overloading the policy distribution server (or other server receiving the feedback information). Likewise, the policy update-check frequency may be periodic per device and randomized across devices. Usually, though not necessarily, the policy update checks will be performed more frequently than the feedback information will be provided, but this need not necessarily be true for all implementations or all intermediary devices and either or both of these schedules may be subject to policies distributed in accordance with the present invention. The subscription delivery nature of the updates, and, potentially, the instructions for reporting feedback information, means that instead of just applying to specific test systems, the instructions are applied to all deployed intermediary devices, thus effectively making the installed base of such devices a multi-node, globally-distributed, and consistent mechanism for sampling device behavior and effectiveness. The selection of which information to transmit as feedback is highly flexible and so can observe and monitor the performance and accuracy of published "solutions" (e.g., published caching solutions for a troublesome web site) in the face of exogenous changes.

The leveraging of a subscription/feedback channel as described above is not limited to deploying and testing the effectiveness of caching policies. The same mechanism can be applied in a number of other contexts. For example, one could use this mechanism to determine usage patterns in a content delivery network or determine which product features of specified devices are actually being enabled in the field (with what settings, effects and impacts).

Figure 4:
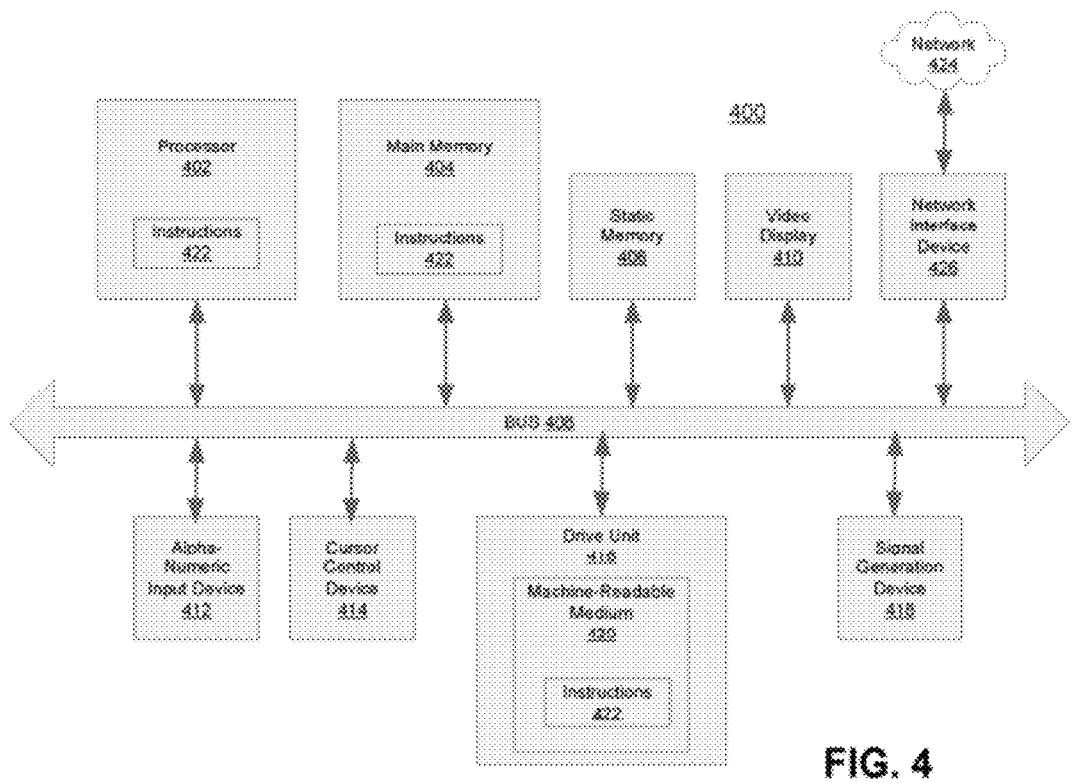
FIG. 4 illustrates an example of a computer device on which computer-executable instructions to perform the methodologies discussed herein may be installed and run.

As alluded to above, the various computer-based devices discussed in connection with the present invention may share similar attributes. FIG. 4 illustrates an exemplary form of a computer system 400, in which a set of instructions can be executed to cause the computer system to perform any one or more of the methodologies discussed herein. Computer system 400 may represent any or all of the clients, servers, or intermediary devices discussed herein. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD)). The computer system 400 also includes an alphanumeric input device 412 (e.g., a keyboard), a cursor control device 414 (e.g., a mouse), a disk drive unit 416, and a signal generation device 418 (e.g. a speaker) and a network interface device 426.

The disk drive unit 416 includes a machine-readable medium 420 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404, and the instruction-storing portions of processor 402 also constituting machine-readable media. The software 422 may further be transmitted or received over a network 424 via the network interface device 426.

While the machine-readable medium 420 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, systems and methods for distributing heuristics to network intermediary devices, said heuristics representing policy updates for such devices, without the need for operating system updates and the like have been described. It should be appreciated that the foregoing descriptions were intended to be illustrative only. For example, the foregoing discussion regarding the distribution of policy updates should be read as including the distribution of directives, heuristics, and/or settings for the intermediary devices. While in some cases these heuristics, settings and directives may be manifest as or instantiated within policies, in other cases they will not be so instantiated and may exist independently of what some may consider policies. Thus the term policy is best understood as referring to policies, directives (e.g., in policy language, etc.), configuration settings, heuristics, or other updates that modify behaviors of intermediary devices and effect desired changes (preferably improvements) in same. Of course, effecting improvement in the caching behavior or functionality of network intermediary devices is a particularly good example of the present invention. Hence, the present invention should be measured only in terms of the claims, which follow.

What is claimed is:

1. A method, comprising distributing, from a policy distribution server to one or more network intermediary devices communicatively coupled to the policy distribution server, on a subscription basis, policy updates to effect desired behaviors of at least one network intermediary device from the one or more network intermediary devices, wherein the policy updates include instructions for data collection by the at least one network intermediary device, and data collected in accordance with said instructions are used as feedback to tune caching policy updates for the at least one network intermediary device that supplied the data collected, and wherein the nature and frequency of the data provided via this feedback process is subject to control of said subscription basis, and the tuned caching policy updates are distributed from the policy distribution server to the at least one network intermediary device.

2. The method of claim 1, wherein the caching policy updates comprise caching policy language files.

3. The method of claim 1, wherein the caching policy updates include directives for the network intermediary devices to cache or not cache one or more of specified web sites or specified objects.

4. The method of claim 1, wherein the caching policy updates include directives for the network intermediary devices to employ specific caching methodologies for specified web sites or specified objects.

5. The method of claim 1, wherein the caching policy updates include directives for the network intermediary devices to cache specified web sites or objects beyond their respective time to live.

6. The method of claim 1, wherein prior to distributing the policy updates, the network intermediary devices are authenticated.

7. The method of claim 6, wherein distributions to the network intermediary devices occur periodically and randomly from one another.

8. The method of claim 7, wherein the distributions to the network intermediary devices are made responsive to requests for same by the network intermediary devices.

9. The method of claim 1, wherein distributions to the network intermediary devices are made responsive to requests for same by the network intermediary devices, said requests being made according to schedules directed by previously distributed policy updates.

10. A system, comprising one or more network intermediary devices and a policy distribution server communicatively coupled to the network intermediary devices, the policy distribution server configured to deliver to the network intermediary devices, on a subscription basis, policy updates to effect desired behaviors of at least one network intermediary device from the one or more network intermediary devices, wherein the policy updates include instructions for data collection by the at least one network intermediary device, and data collected in accordance with said instructions are used as feedback to tune caching policy updates for the at least one network intermediary device that supplied the data collected, and wherein the nature and frequency of the data provided via this feedback process is subject to control of said subscription basis, and the tuned caching policy updates are distributed from the policy distribution server to the at least one network intermediary device.

11. The system of claim 10, wherein the caching policy updates comprise caching policy language files.

12. The system of claim 10, wherein the caching policy updates include some or all of: directives for data collection by the network intermediary devices, directives for the network intermediary devices to cache or not cache one or more of specified web sites or specified objects, directives for the network intermediary devices to employ specific caching methodologies for specified web sites or specified objects, and directives for the network intermediary devices to cache specified web sites or objects beyond their respective time to live.

13. The system of claim 10, wherein prior to distributing the policy updates, the network intermediary devices are authenticated.

14. The system of claim 13, wherein distributions to the network intermediary devices occur periodically and randomly from one another.

15. The system of claim 14, wherein the distributions to the network intermediary devices are made responsive to requests for same by the network intermediary devices.

16. The system of claim 10, wherein distributions to the network intermediary devices are made responsive to requests for same by the network intermediary devices, said requests being made according to schedules directed by previously distributed policy updates.

17. A network intermediary device, comprising:
a processor;
a storage device connected to the processor; and
a set of instructions on the storage device that are executable by the processor, including:
a transactor software sub-routine configured to establish a connection at a beginning of a client/intermediary device communication, facilitate processing of a request and response throughout the communication, and close the connection at an end of the communication;
a policy administrator software sub-routine configured to maintain current versions of policies distributed to the network intermediary device from a policy distribution server, on a subscription basis, and assign to the transactor software sub-routine a most current version of a policy available at a beginning of the communication; and a policy evaluator software sub-routine configured to collect statistics regarding operations of the transactor software sub-routine for various communications and policies for reporting to the policy distribution server, wherein (i) the transactor software sub-routine is further configured to handle the communication in accordance with an assigned policy specified by the policy administrator software sub-routine and perform designated activities in accordance with the assigned policy when the communication reaches specified checkpoints and (ii) the statistics are used as feedback to tune caching policy updates distributed from the policy distribution server to the network intermediary device that supplied the statistics that were collected and reported to the policy distribution server, and wherein the nature and frequency of the statistics provided via this feedback process is subject to control of said subscription basis.

* * * * *